United States Patent
Linnell et al.

(10) Patent No.: US 9,808,992 B1
(45) Date of Patent: Nov. 7, 2017

(54) MODULAR 3D PRINTING USING A ROBOT ARM

(71) Applicant: X Development LLC, Mountain View, CA (US)

(72) Inventors: Jeffrey Linnell, San Francisco, CA (US); Jonathan Proto, San Francisco, CA (US); Brandon Kruysman, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 569 days.

(21) Appl. No.: 14/463,530

(22) Filed: Aug. 19, 2014

Related U.S. Application Data (60) Provisional application No. 61/987,367, filed on May 1, 2014.

(51) Int. Cl.
 *B29C 67/00* (2017.01)

(52) U.S. Cl.
 CPC ...... *B29C 67/0059* (2013.01); *B29C 67/0066* (2013.01); *Y10S 901/02* (2013.01)

(58) Field of Classification Search
 CPC ............ B29C 67/0085; B29C 67/0066; B29C 67/0088; B29C 67/0062; B29C 67/007; A61C 13/0013
 USPC ........................................ 264/401; 425/174.4
 See application file for complete search history.

(56) References Cited

U.S. PATENT DOCUMENTS

| | | | | |
|---|---|---|---|---|
| 4,575,330 | A * | 3/1986 | Hull | B29C 67/0062 264/401 |
| 2012/0195994 | A1* | 8/2012 | El-Siblani | B29C 67/007 425/174.4 |

FOREIGN PATENT DOCUMENTS

DE         4102260 A1 *  7/1992  ......... B29C 67/0066

OTHER PUBLICATIONS

Melchels, et al., "A review on stereolithography and its Applications in biomedical engineering", 2010, published in QUT Digital Repository: http://eprints.qut.edu.au/, Biomaterials, 31(24). pp. 6121-6130.

(Continued)

*Primary Examiner* — Timothy Kennedy
(74) *Attorney, Agent, or Firm* — Fish & Richardson P.C.

(57) ABSTRACT

An example three-dimensional printer system includes (a) a resin container, (b) a base plate, (c) a light source arranged below the resin container, where the light source is operable to emit electromagnetic radiation that causes resin in the resin container to cure, (d) a robotic device having the base plate attached thereto, wherein the robotic device positions the base plate above the resin container and is operable to move the base plate with at least two degrees of freedom, such that a build volume of the three-dimensional printer system extends beyond the edges of the resin container, and (e) a control system that is operable to (i) receive data specifying a three-dimensional structure and (ii) generate control signals that coordinate movement of the base plate by the robotic device and operation of the light source to form the three-dimensional structure from layers of resin.

22 Claims, 11 Drawing Sheets

(56) References Cited

OTHER PUBLICATIONS

Pan, et al., "Fast Recoating Methods for the Projection-based Stereolithography Process in Micro-and Macro-Scales", 2012, Daniel J. Epstein Department of Industrial and Systems Engineering University of Southern California.
Novikov et al., "Mataerial—Anti-gravity Object Modeling", 2013, from the website: www.mataerial.com/#description.
ArchDaily, "SCI-Arc's Gehry Prize awarded to 'Phantom Geometry'", Oct. 22, 2012, from the website: www.archdaily.com.

\* cited by examiner

FIG. 4

MODULAR 3D PRINTING USING A ROBOT ARM

CROSS REFERENCE TO RELATED APPLICATIONS

This application claims priority to U.S. Provisional Patent Application No. 61/987,367, filed May 1, 2014, entitled "Modular 3D Printing Using a Robot Arm", the contents of which are incorporated by reference herein for all purposes.

BACKGROUND

Three-Dimensional ("3D") printing is an additive manufacturing process in which successive layers of material are laid down on top of each other to form a solid 3D object. Over time, various types of 3D printing process have been developed, including extrusion-based 3D printing (e.g., fused deposition modeling (FDM)), and processes based on light polymerization, such as stereolithography (SLA) and digital light processing (DLP), among others.

In stereolithography processes, a 3D structure is built up one layer at a time, with each layer being formed by exposing a photo-reactive resin to an ultraviolet (UV) light source that cures the resin. Note that stereolithography may also be referred to as optical fabrication, photo-solidification, and/or solid free-form fabrication and solid imaging.

More specifically, in a typical stereolithography process, a digital 3D model of an object is created by a user via the software interface of a 3D printing application. The 3D printing application then slices the 3D model with a set of horizontal planes. Each slice of the 3D model can then be converted to a two-dimensional mask image, such that the 3D model is represented as a sequence of two-dimensional mask images, which each outline the shape of the corresponding layer from the 3D model. The mask images sequentially projected onto a photo-curable liquid or powders resin surface while light is projected onto the resin to cure it in the shape of the layer. Alternatively, instead of using masks, each slice of the 3D model may be representing by a two-dimensional image in the shape of the slice, so that a projector can project a sequence of such two-dimensional images onto the resin surface to form an object corresponding to the digital 3D model.

SUMMARY 3D printers that use stereolithography and other 3D printing processes, have typically formed layers in horizontal planes, such that the layers of material that form the resulting object are parallel to one another. Further, current 3D printers typically only work with one material at a time.

Advantageously, example embodiments attach the base plate, on which a 3D-printed object is built up layer-by-layer, to a robotic arm that can change the pose of base plate with respect to the resin. Configured as such, the robotic arm can change the pose of the base plate during the printing process, such that layers of material are angled with respect to one another.

In one aspect, a three-dimensional printer system includes: (i) a resin container; (ii) a base plate; (iii) a light source arranged below the resin container, wherein the light source is operable to emit electromagnetic radiation that causes resin in the resin container to cure, (iv) a robotic device having the base plate attached thereto, wherein the robotic device positions the base plate above the resin container and is operable to move the base plate with at least two degrees of freedom, such that a build volume of the three-dimensional printer system extends beyond the edges of the resin container; and (v) a control system that is operable to: (a) receive data specifying a three-dimensional structure; and (b) based at least in part on the specified structure, generate control signals that coordinate movement of the base plate by the robotic device and operation of the light source to form the three-dimensional structure from layers of resin, wherein each layer of resin is formed by exposure of resin in the resin container to electromagnetic radiation from the light source.

In another aspect, a three-dimensional printer system includes: (i) a base plate; (ii) a plurality of resin containers comprising at least a first resin container and a second resin container; (iii) a plurality of light sources, wherein at least one light source is arranged below each resin container; (iv) a robotic device having the base plate attached thereto, wherein the robotic device is operable to move the base plate between the plurality of resin containers such that the base plate is positionable above each of the resin containers while a layer of resin is being formed on the base plate, and wherein the robotic device is operable to move the base plate with at least two degrees of freedom; and (v) a control system that is operable to: (a) receive data specifying a three-dimensional structure; and (b) based at least in part on the specified structure, generate control signals that coordinate movement of the base plate by the robotic device and operation of the plurality of light sources to form the three-dimensional structure from layers of resin, wherein at least a first layer of resin is formed by exposure of resin in the first resin container to electromagnetic radiation from the at least one light source under the first resin container, and at least a second layer of resin is formed by exposure of resin in the second resin container to electromagnetic radiation from the at least one light source under the second resin container.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

The following detailed description describes various features and functions of the disclosure with reference to the accompanying Figures. In the Figures, similar symbols typically identify similar components, unless context dictates otherwise. The illustrative apparatuses described herein are not meant to be limiting. It will be readily understood that certain aspects of the disclosure can be arranged and combined in a wide variety of different configurations, all of which are contemplated herein.

I. OVERVIEW

Example embodiments relate to 3D printing systems and methods. In particular, an example 3D printer may include a robotic arm or another robotic device that suspends a base plate above a photo-reactive resin. The robotic arm initially submerges the base plate in the resin while a projector below the resin projects an image towards the photo-reactive resin to form the first layer on the base plate. The robotic arm then moves the base plate, and the first layer, as a subsequent layer is cured on the first layer. This process is then repeated as the object is built up layer by layer.

In an example embodiment, the robotic arm may be configured to move the base plate, and thus the object being printed thereon, with two or more degrees of freedom. This, in turn, may allow for the creation of layers that are "wedge-shaped," or in other words, that have opposing surfaces in non-parallel planes. Accordingly, some or all layers may be non-parallel to an adjacent layer. Configured as such, an example 3D printing system may allow for the creation of objects that are much larger than those that can be created in a 3D printer where the build volume is constrained, e.g., by the dimensions the resin pan.

Further, the ability to vary the angle of layers in a 3D-printed object may allow for flexibility in structural design and/or greater control of the structural characteristics of 3D-printed objects. For instance, by changing the orientation of layers within a 3-D printed object, it may be possible to intelligently control characteristics of the object such as structural rigidity, elasticity, etc.

Additionally or alternatively, an example 3D printer system may allow for creation of objects with less temporary support structures than might otherwise be needed during the 3D printing process. For example, 3D printing of an object such as an arch (or another object with an overhang) might otherwise require that support structures be created beneath the arch, in order to support the arch during the printing process. When such support structures need to be removed after 3D printing an object, this can add time and/or manual labor to the process, and can result in imperfections at locations where supports are removed. However, in some embodiments, the base plate suspends an in-progress object from above during the printing process, which in some cases may remove the need to create support structures below the object.

It should be understood that the possible benefits described above and elsewhere herein are not required. Further, other benefits are possible.

II. COMPONENTS OF ILLUSTRATIVE 3D PRINTER SYSTEMS

Figure 1A:
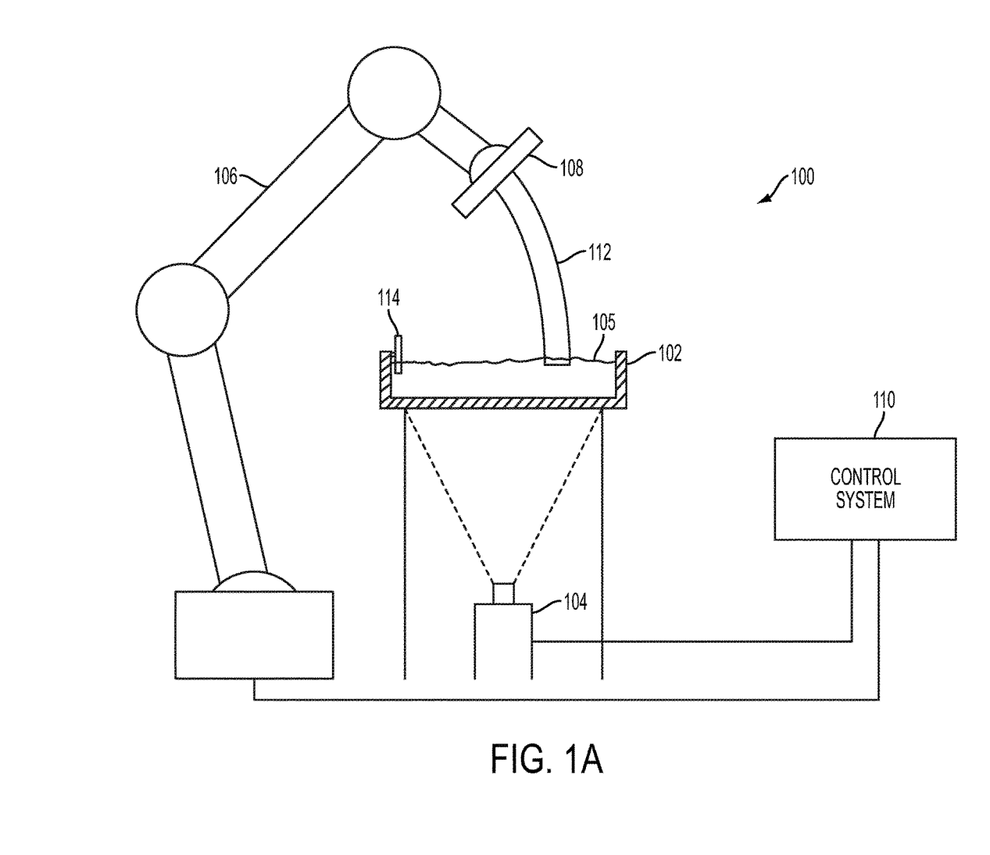
FIG. 1A shows a 3D printer system, according to an example embodiment.

FIG. 1A shows a 3D printer system 100 according to an example embodiment. The 3D printer system 100 includes a resin container 102, as well as a light source 104 arranged below the resin container. The light source 104 is operable to emit electromagnetic radiation towards the resin container in a controlled manner, such that the electromagnetic radiation cures the resin 105 in the resin container 102. Further, 3D printer system 100 includes a robotic arm 106 having the base plate 108 attached thereto.

The robotic arm 106 is operable to position the base plate 108 above the resin container 102, and to move the base plate 108 with respect to the resin container 102 with at least two degrees of freedom (and more specifically, in the illustrated example, with six degrees of freedom). As a result, the build volume of the 3D printer system 100 extends beyond the edges of the resin container.

In an example embodiment, the robotic arm 106 may be an articulated robot with three rotary joints, allowing the robotic arm 106 six degrees of freedom. However, more or less rotary joints are possible. Further, note that that a 3D printer system can mount a base plate to various types of robotic devices, and is not limited to robotic arms. For example, the base plate could be mounted to a two-axis head unit, or a robotic arm having four degrees of freedom. Other examples are also possible.

The base plate 108 may be implemented as an end effector on robotic arm 106. Further, robotic arm 106 may be programmable, such that a set of control instructions can be generated to moves the robotic arm 106 in a manner that results in creation of a particular object on base plate 108.

A base plate 108 may vary in size and/or shape, depending upon the particular embodiment. Further, the base plate 108 may be formed from various materials or combinations of materials, depending upon the particular embodiment. Generally, the surface of the base plate 108 may be formed from any material to which a base layer of resin will adhere when cured. Further, since the base plate holds the object being printed from above, the size, the weight distribution, the shape, and/or the adhesive properties of the base plate's surface that faces the resin container, may be designed so as to provide support for certain loads (e.g., so that the base plate can hold objects up to a certain weight, shape, and/or size).

The resin container 102 may be of various sizes and/or shapes, depending upon the particular embodiment. Further, the bottom of the resin container 102 may be formed from any material that allows for transmission of electromagnetic waves from the appropriate region of the electromagnetic spectrum for curing the resin 105, such that the appropriate electromagnetic waves emitted by projector 104 can pass through the bottom of the resin container 102 to cure the resin 105. For example, if resin 105 is a ultraviolet-curable photopolymer, then the bottom of resin container 102 may be formed from any material that ultraviolet waves can pass through. Other examples are possible.

Further, note that example embodiments are not limited to the stereolithography techniques described herein. In some embodiments, a laser could be used to cure the resin instead of a UV light source. Further, various types of resins may be utilized, including liquid and powdered photo-curable resins, without departing from the scope of the invention. Other variations on the embodiments described herein are also possible.

The projector 104 may take various forms, depending upon the particular implementation. In general, the projector may be any controllable light source that emits electromagnetic waves from the appropriate region of the electromagnetic spectrum for curing the resin 105. In some embodiments, the projector 104 may be controllable to emit electromagnetic radiation (e.g., UV light) that is shaped according to a particular slice of a 3D model, such that the resin 105 cures to form a layer of the 3D object having the same shape. In some embodiments, the projector could be a standard consumer projector having its UV filter removed. Other types of projectors are also possible.

In a further aspect, it may be desirable to agitate the surface of the resin 105 during the 3D printing process. Specifically, agitating the surface of the resin may improve the 3D printing process by, e.g., improving the uniformity of the layers in the printed object. Thus, in some embodiments, such as that shown in FIG. 1, a scraper 114 may be implemented in resin container 102. The scraper 114 may be operable to move across the resin container 102, in order to agitate the surface of the liquid resin 105.

For example, the scraper 114 may be operated to periodically agitate or "scrape" the surface of resin 105 during the process of 3D printing an object, such as after the formation of each layer, or according to some predetermined interval. In some implementations, the scraper 114 may be operated manually by a human. Additionally or alternatively, the scraper 114 may be automated (e.g., motorized), such that a control system 110 can automatically operate the scraper during the 3D process. For example, a control system 110 may automatically move the scraper across the resin container 102 after the curing of each layer is completed.

The build volume of an example system, such as 3D printer system 100, may be defined at least in part by the range of movement and/or the reach of the robotic device to which the base plate is mounted. For example, in FIG. 1, the build volume may be defined by the range of movement of the robotic arm 106. Other examples are possible.

Further, example embodiments, such as the 3D printer system 100, may allow for the creation of objects that are much larger than those that can be created in a 3D printer where the build volume is defined by the dimensions the pan (e.g., the surface area of resin container 102) and/or by the surface area of the base plate.

For example, consider FIGS. 1C to 1F, which collectively illustrate the movement of the robotic arm 106 from an example 3D printer system 100, during the process of 3D printing an arch-shaped object 112. More specifically, FIGS. 1C to 1F show the state of the arch-shaped object 112 at various stages of the 3D printing process, progressing chronologically from FIG. 1C to FIG. 1F. During this process, the robotic arm 106 moves the base plate 108 along a curvature 130, in order to create the arch-shaped object 112. Since the build volume is defined at least in part by the robotic arm's range of movement, the 3D printer is able to create an arch-shaped object 500 extends well beyond the edges of the resin container.

Further, example embodiments, such as 3D printer system 100, may allow for creation of objects with non-parallel layers. Specifically, when the base plate is mounted on a robotic device with two or more degrees of freedom, such as the robotic arm 108, the robotic device can vary pose of the base plate, and thus the pose of the in-progress object, with respect to the surface of the resin 105, such that layers of the object are angled with respect to one another. For example, the angle of the base plate may be changes at various times during the 3D printing process shown in FIGS. 1C to 1F, such that at least some of the layers in the arch-shaped object 112 are wedge-shaped.

Additionally or alternatively, a system such as 3D printer system 100 may allow for creation of objects with less support structures than would typically result from other 3D printing techniques (e.g., structures such as arches or other objects with an overhang that would typically include supports). When support structures need to be removed after 3D printing an object, this can add time and/or manual labor to the process, and can result in imperfections at locations where supports are removed. Thus, a printer such as 3D printer system 100 may be able to produce objects with smoother surfaces, as compared to other types of 3D printers.

For example, in a system where the base plate does not suspend the object from above the resin container, printing an arch, or another object with an overhang, might require that supports be created for the arch or overhang during the 3D printing process. However, when the base plate suspends an object over the resin container, such as in 3D printer system 100, such supports may not be required.

In some cases, the ability to print non-parallel layers may make it easier to create curved objects, such as the arch-shaped object 112 shown in FIGS. 1C to 1F. Additionally or alternatively, by changing the orientation of layers within a 3D printed object, it may be possible to intelligently control characteristics of the object such as structural rigidity, elasticity, etc. Accordingly, a 3D printer system 100 may allow for more flexibility in specifying the structural characteristics of an object being printed. For example, a 3D printer system 100 may be used to create a more stable structure (e.g., a structure that can manage higher compression loads). Other examples are also possible.

III. CONTROL OF AN EXAMPLE 3D PRINTER SYSTEM

Referring again to FIG. 1A, a 3D printer system 100 may also include or be communicatively coupled to a control system 110. A control system 110 may take the form of or include executable program logic, which may be provided as part of or in conjunction with a 3D printer system 100. Such program logic may be executable to, e.g., generate control signals for a 3D printer system 100. For example, a number of program-logic modules may be included as part of a control system, such as control system 110.

In an example embodiment, control system 110 may be operable to: (a) receive data include a three-dimensional model of an object or structure, and (b) based at least in part on the 3D model, generate control signals that coordinate movement of the base plate 108 (via control of the robotic device 106) with the operation of the light source 104 to form the object 112 specified by the 3D model in a layer-by-layer manner. In particular, each layer of resin in the object 112 is formed by exposure of resin in the resin container to electromagnetic radiation from the light source.

Figure 1B:
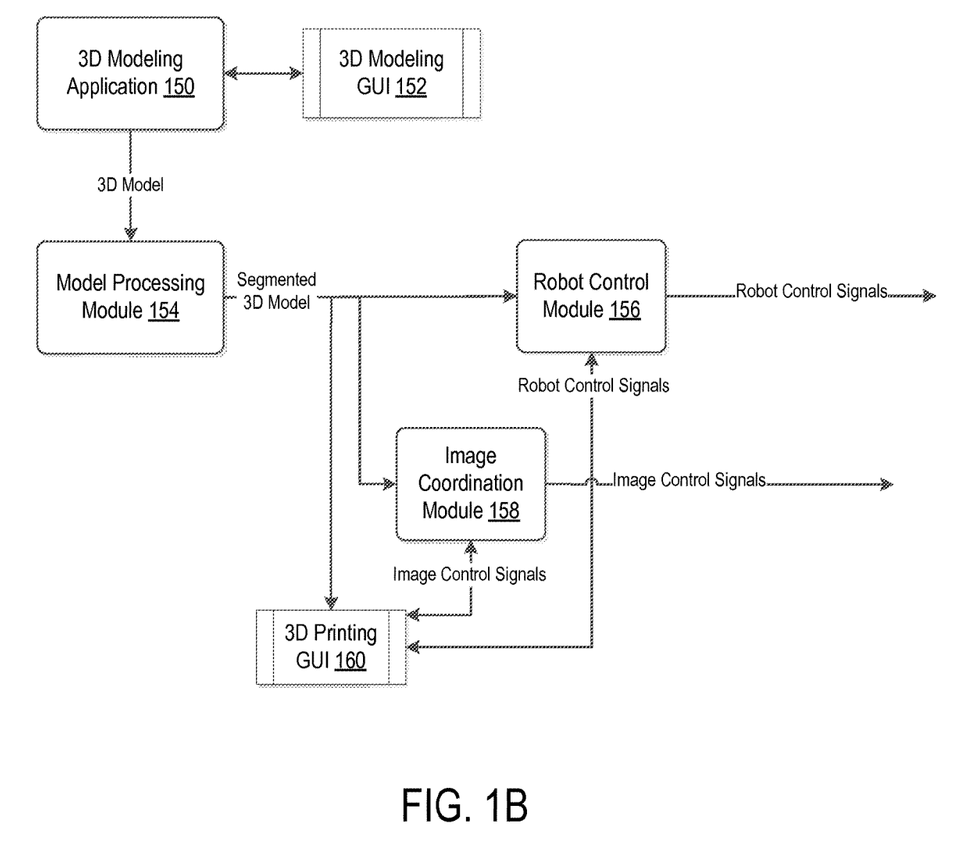
FIG. 1B shows example program logic modules for interfacing with and controlling a 3D printer system.
Figure 1C:
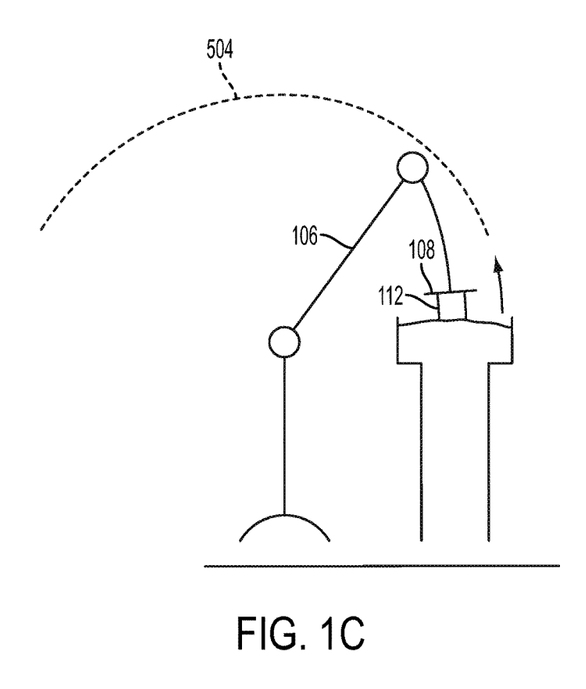
FIGS. 1C to 1F illustrate the movement of a robotic arm during the process of 3D printing an object, according to an example embodiment.
Figure 1D:
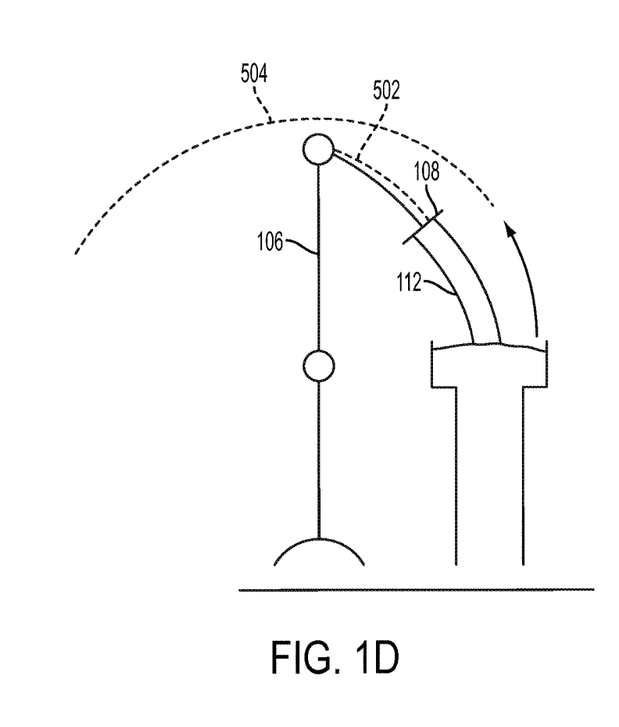
Figure 1E:
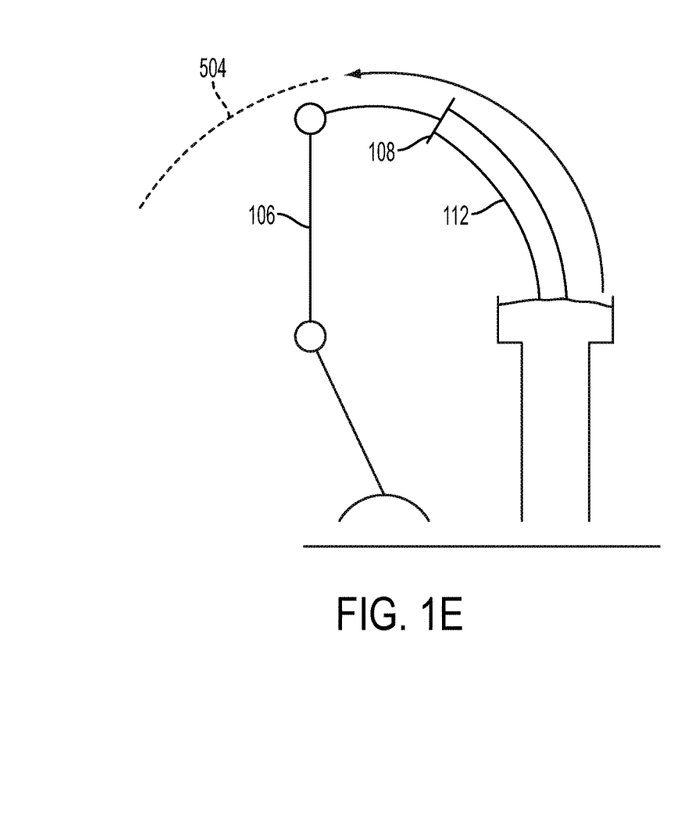
Figure 1F:
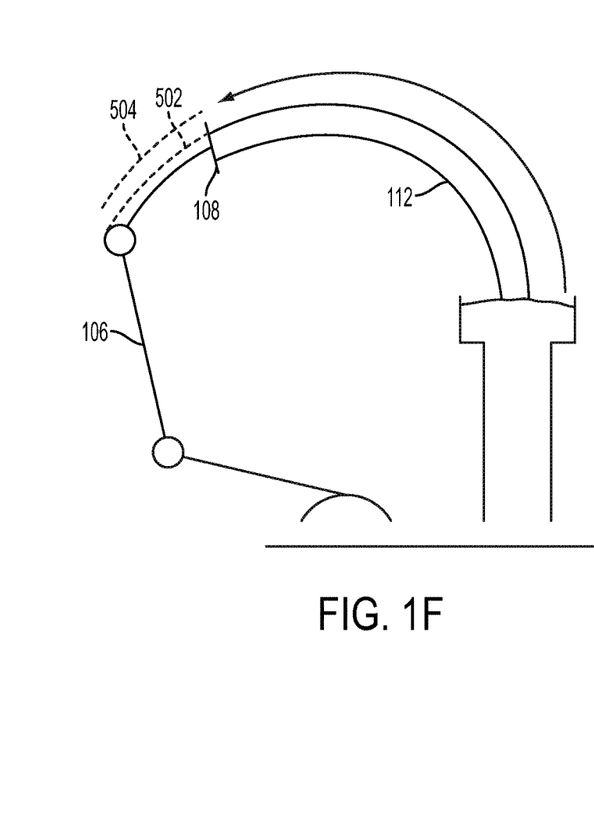

FIG. 1B shows example program logic modules for interfacing with and controlling a 3D printer system. In particular, a 3D-modeling application 150 and corresponding GUI 152 may allow for 3D model generation. Further, to prepare the 3D model for printing, a model-processing module 154 may apply a slicing process to the 3D model. For example, various techniques may be used to define an isosurface mesh for a 3D model, which may then be sliced into layers. Other examples are also possible.

The slicing process may slice the 3D model into segments, which each correspond to a layer, such that the object portrayed by the 3D model can be generated layer by layer from the segments of the 3D model. In addition, the 3D model may be sliced along non-parallel planes, such that some or all of the segments have opposing surfaces that are non-parallel.

The segmented 3D model may then be passed to both: (i) a robot-control module 156, which may generate robot control signals, and (ii) an image coordination module 158, which may generate image control signals signal for 3D printing, including image files and light-source control signals, in order to print a 3D object based on the 3D model. Further, note that the robot control module 156, the image coordination module 158, and/or other program logic modules may coordinate the timing of the robot control signals with the timing of the image control signals, so that the 3D printing process is properly carried out.

Figure 2A:
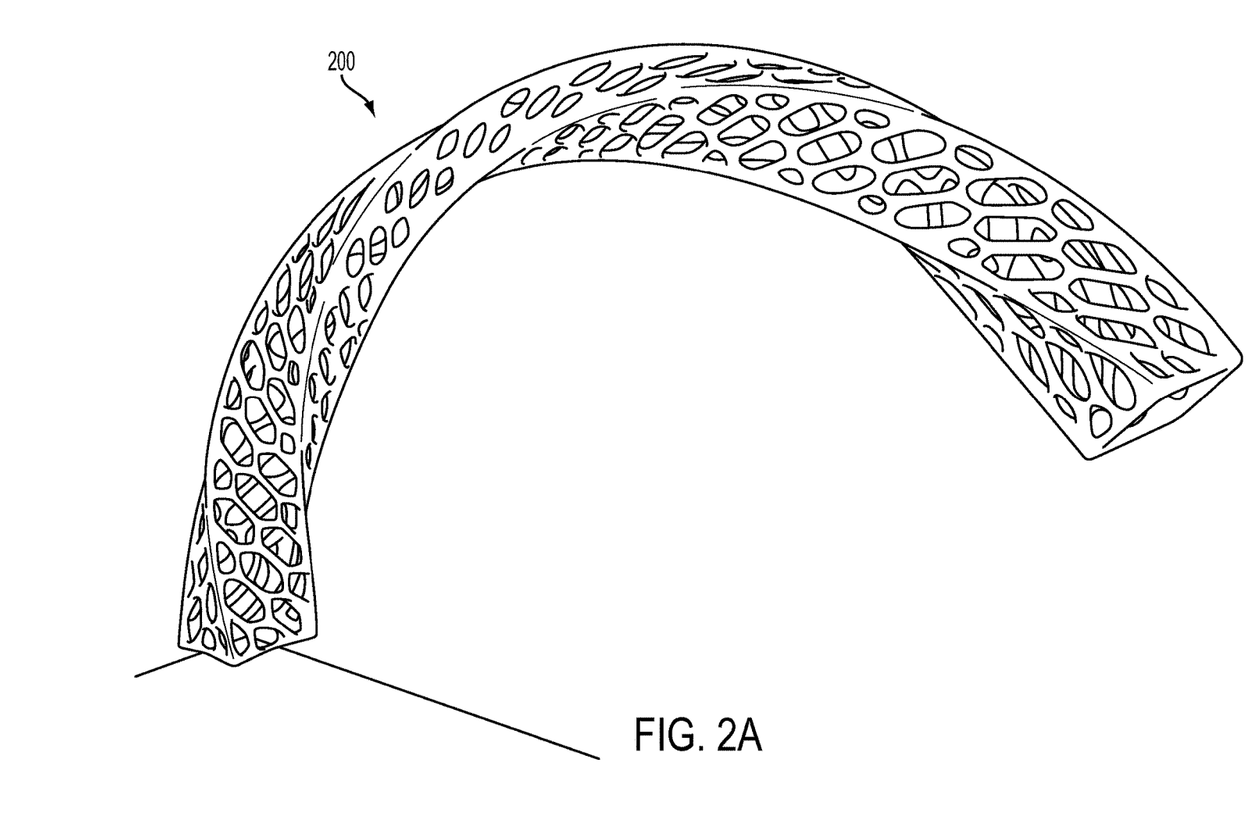
FIG. 2A shows an example of a 3D model.

FIG. 2A shows an example of a 3D model 200. The 3D model 200 may have been generated using a 3D modeling application 150, which, in practice, could be any available computer-based 3D modeling software. Of course, the 3D model 200 may have been generated in another manner, without departing from the scope of the invention.

Figure 2B:
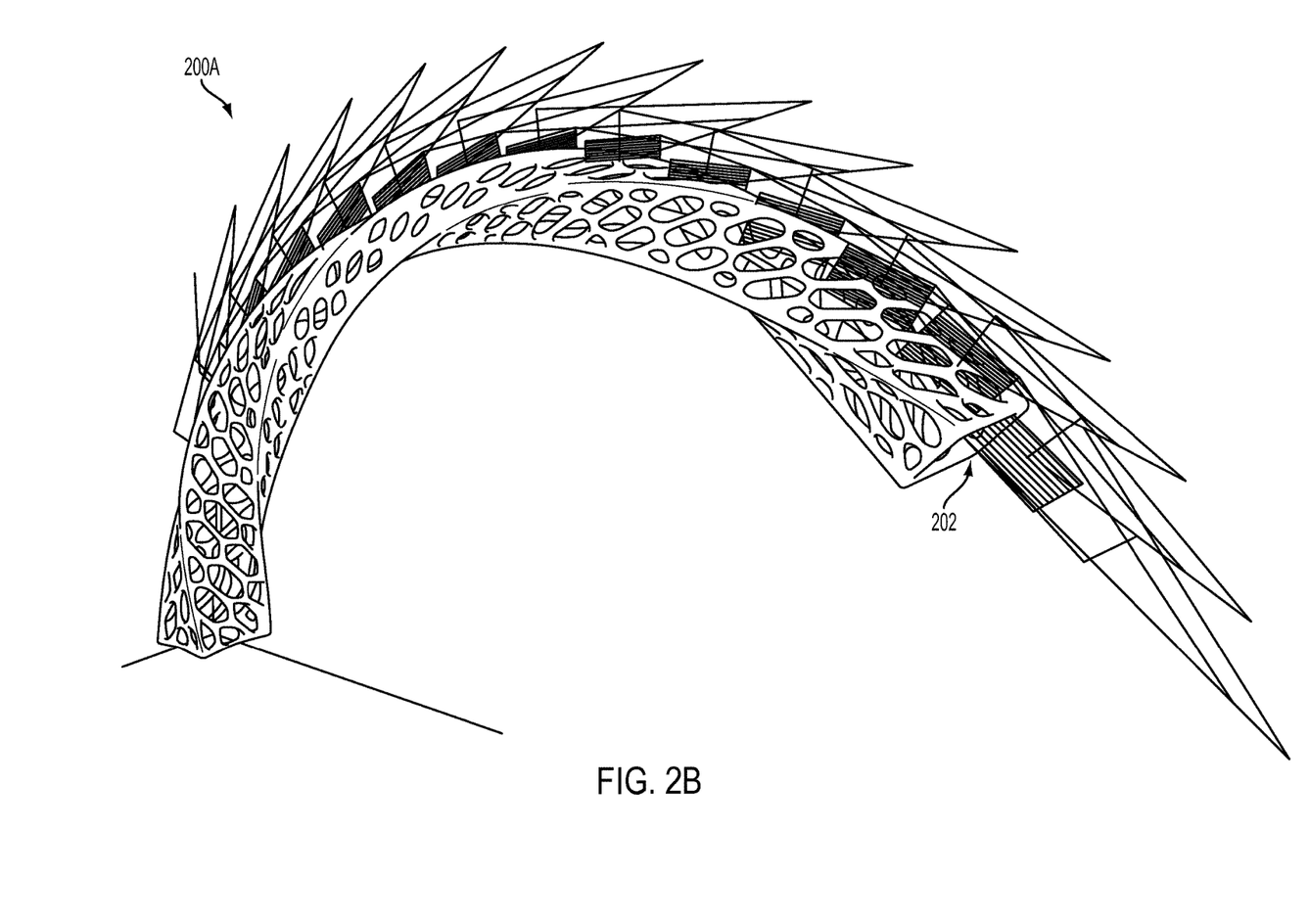
FIG. 2B is a rendering of a 3D model, which is generated by processing the 3D model shown in FIG. 2A

FIG. 2B is a rendering of a 3D model 200a, which is generated by processing the 3D model 200 shown in FIG. 2A. In the illustrated embodiment, the sectioning process that is applied to generate the segmented 3D model 200a may be a two-part process. In particular, a curvature 202 of the 3D model may be determined. (Note that for some 3D models, multiple curvatures could be determined.)

Figure 2C:
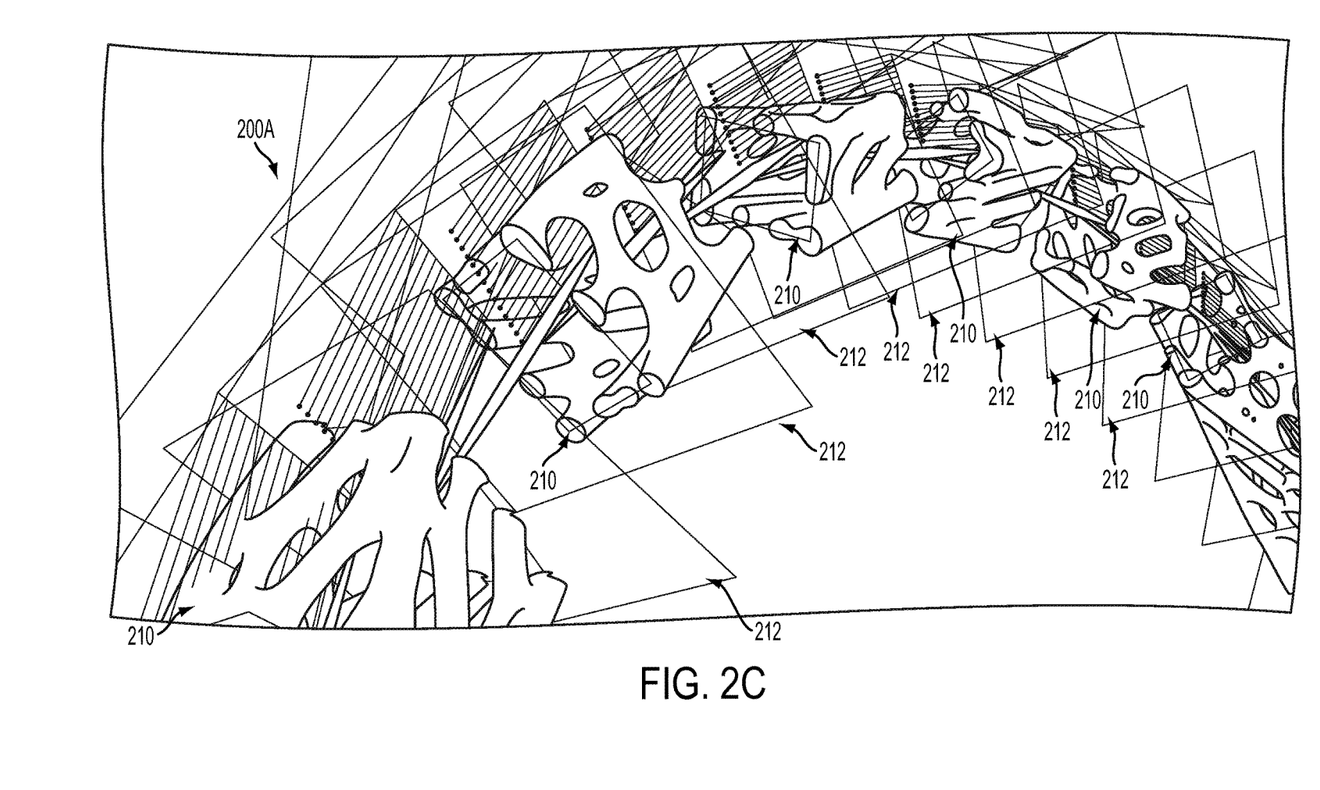
FIG. 2C shows a portion of the 3D model shown in FIG. 2B, after an example slicing process is used to slice the 3D model into a number of segment chunks.

The curvature 202 may then be used to determine slice planes, which are used to slice the 3D model 200a into "segment chunks." For example, FIG. 2C shows a portion of 3D model 200a, after an example slicing process is used to slice the 3D model 200a into a number of segment chunks 210. The segment chunks 210 are defined using slice planes 212, which are perpendicular to the curvature 202 of the 3D model 200a. (Note that in FIG. 2B, each slice plane 212 is shown twice; on the respective surfaces of the two segment chunks that are defined by the given slice plane 212.)

Further, as shown in FIG. 2C, each segment chunk 210 may be sub-divided into multiple segments, with each segment representing a layer of the 3D model for purposes of printing. Since the slice planes 212 are perpendicular to the curvature 202, the two slice planes 212 that define a given segment chunk 210 may be non-parallel planes. As such, the lower surface of a given segment chunk (e.g., the lower surface of the lower-most layer in the chunk) may be angled with respect to the upper surface of the segment chunk (e.g., the upper surface of the upper-most layer in the chunk).

Figure 2D:
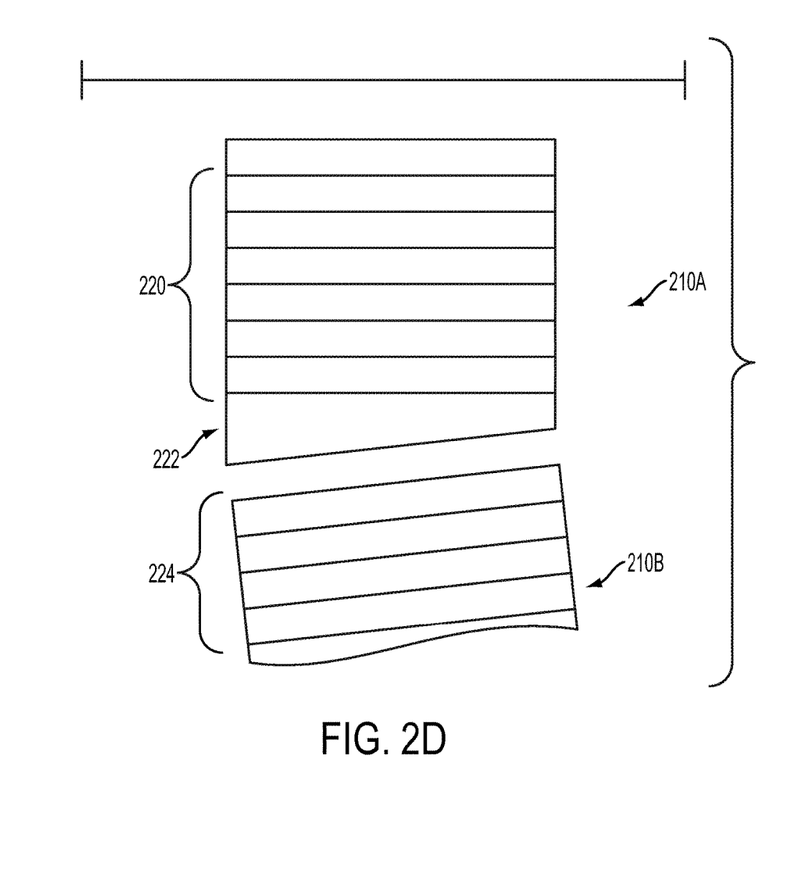
FIG. 2D shows a cross-section of a two segment chunks, according to an example embodiment.

FIG. 2D shows a cross-section of a two segment chunks 210A and 210B, according to an example embodiment. In the illustrated example, the segment chunk 210A is formed by a number of parallel layers 220, and a single angled layer 222. In the example shown in FIGS. 2A to 2C, the slicing process may produce a segmented 3D model where each segment chunk is formed from multiple parallel layers and a single angled layer, as shown in FIG. 2D.

Figure 3:
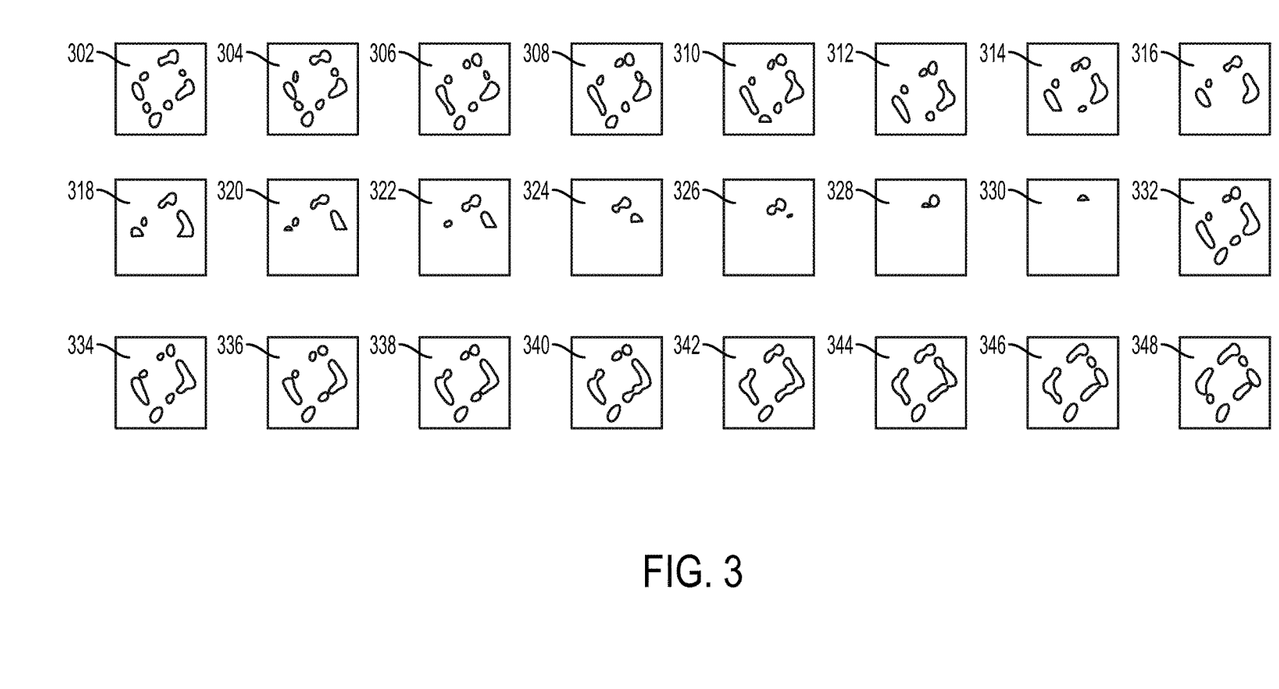
FIG. 3 shows image data that may be used to form an angled layer of a segment chunk, according to an example embodiment.

FIG. 3 shows image data that may be used to form an angled layer 222 of a segment chunk 210A. Specifically, images 302 to 310 may be used to form the four layers preceding the angled layer 222 in segment chunk 210A. After the layer formed using each image 302 to 310, the robotic arm may raise the object out of the resin, so as to define the layer.

Then, the angled layer 222 may be built up using images 312 to 330. The angled layer may have a first surface that is proximate and parallel to the previous layer, and a second surface that is distal and angled with respect to the previous layer (and thus with respect to the first surface and the surface of the resin). In practice, the angled layer 222 may actually be formed from a number of very thin layers (e.g., thinner than the layers formed using images 302 to 310), which are built up using images 312 to 330, such that the thin layers define the second surface that is angled with respect to the first surface. Further, a subsequent chunk (not shown) may be built up using images 312 to 330.

During the formation of the layers 220 based on images 302 to 308, and during formation of the angled layer 222, the robotic arm may position the in-progress object such that the first surface of the angled layer 222 (e.g., the surface is proximate to the base plate) is parallel to the surface of the resin in the resin container. Once the second surface of the angled layer 222 is defined and the angled layer is complete, the robotic arm may remove the in-progress object from the resin, and adjust the angle of the in-progress object such that the second surface is parallel to the surface of the resin. The robotic arm may then proceed to create layers 224 of the next segment chunk 210B. As shown in FIG. 2D, layers 224 of the next segment chunk 210B may be parallel to the second surface of the angled layer 222. (Further, while not explicitly shown, the next segment chunk 210B may also include an angled layer).

It should be understood that variations on an example multi-directional slicing process illustrated in FIGS. 2A to 2D, an entirely different multi-directional slicing processes, are also possible. As just one example, a slicing process could slice a 3D model more granular manner, such that each layer could be angled with respect to, or parallel to, the previous layer. Other examples are also possible.

Figure 4:
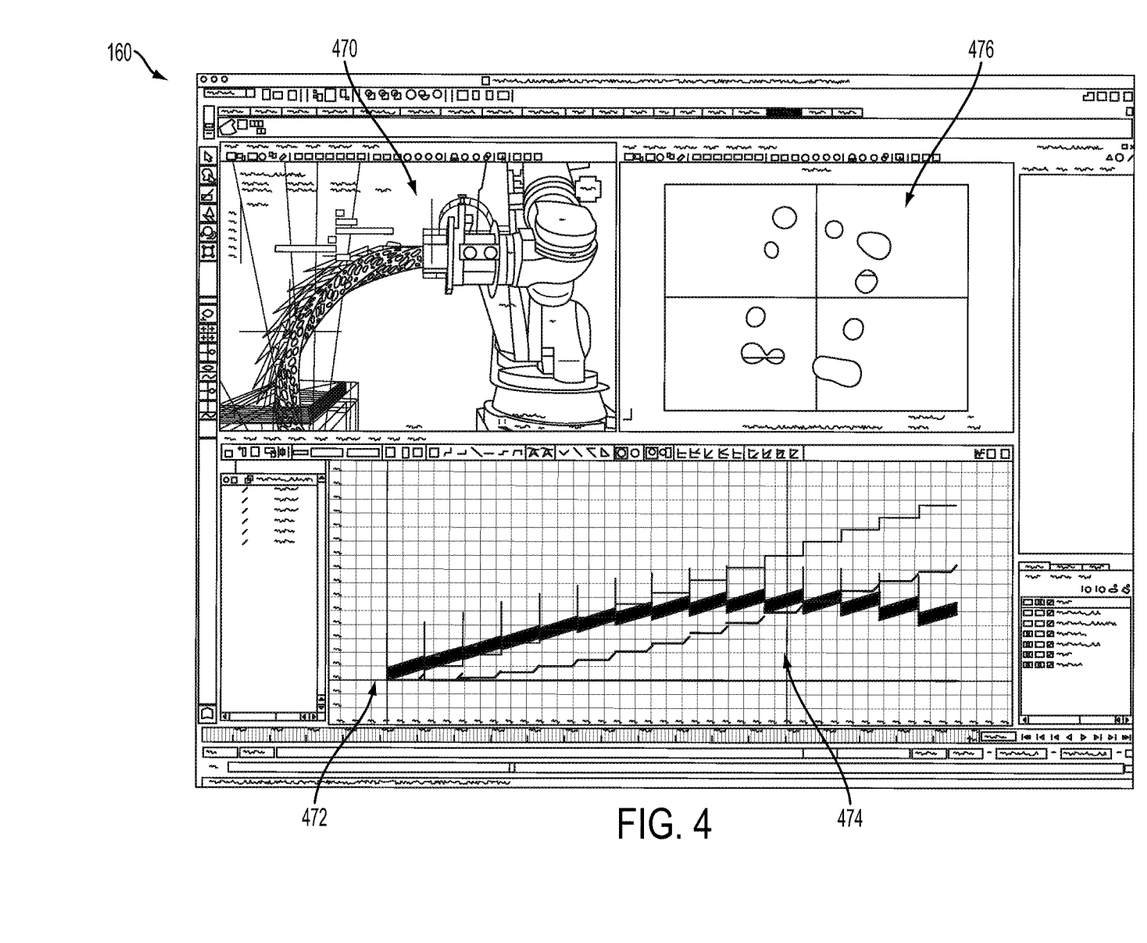
FIG. 4 shows a graphical user interface for a 3D printing system, according to an example embodiment.

Referring back to FIG. 1B, a 3D printing GUI 160 may be provided. The 3D printing GUI 160 may receive data specifying the segmented 3D model, as well as data indicating robot control signals and/or image control signals. For example, FIG. 4 shows a 3D printing GUI 160 according to an example embodiment. The GUI 160 may provide a 3D rendering window 470 of the 3D model and robotic arm, which is updated throughout the 3D printing process to show the current status of the process. The visualization of the 3D object and the printing system in window 470 may be generated from a rendering environment in which the 3D object and components of the 3D printing system are rendered based on respective initial coordinates, and movements within the rendering environment corresponding to the robot control instructions.

The GUI 160 may also use the robot control signal data to provide a timeline visualization 472, which shows the movements of the robotic arm during the course of the 3D printing process. As the 3D printing process is carried out, a progress indicator 474 may move across timeline visualization 472 to indicate the current point in the process.

Further, the GUI 160 includes a current-layer image window 476, which shows the image file that is currently being used to form a layer. In some embodiments, the image in the current-layer image window 476 may be generated by a virtual camera in the rendering environment defined for window 470. For example, a virtual orthographic camera may be defined as having a field-of-view that is perpendicular to and includes the resin container in the rendering environment. The virtual orthographic camera may therefore capture a cross sectional image of the object that is being printed, as it is moved through the resin container in the rendering environment. This cross-sectional image may then be displayed in current-layer image window 476.

Further, an example GUI 160 may allow the user to control or modify the 3D printing system before and/or during the printing process. For example, the user may be able to change or modify the movements of the robotic arm via interactions with the timeline visualization 472. As another example, the user may be able to change the shape of a given layer via interaction with current-layer image window 476. In some cases, the GUI 160 may allow the user to pause the 3D printing process, make adjustments, and then resume the printing process. Additionally or alternatively, the GUI 160 may allow the user to make adjustments in real-time, during the printing process.

IV. MULTI-PHASE 3D PRINTING SYSTEM

In some embodiments, a robotic arm could be used to move an object between two or more resin containers during the 3D printing process. Further, each resin container may include different types of material, such that different layers of an object can be formed with different materials, and/or such a portions of a single layer of an object can be formed with different materials. Such an embodiment may use a single robotic arm to provide for an "assembly line" style 3D printing process, where the object being formed is moved between (and possibly back and forth between) multiple vats of resin. Note that, in addition to various types of resins, some or all of the containers may include other types of photo-reactive materials.

Figure 5:
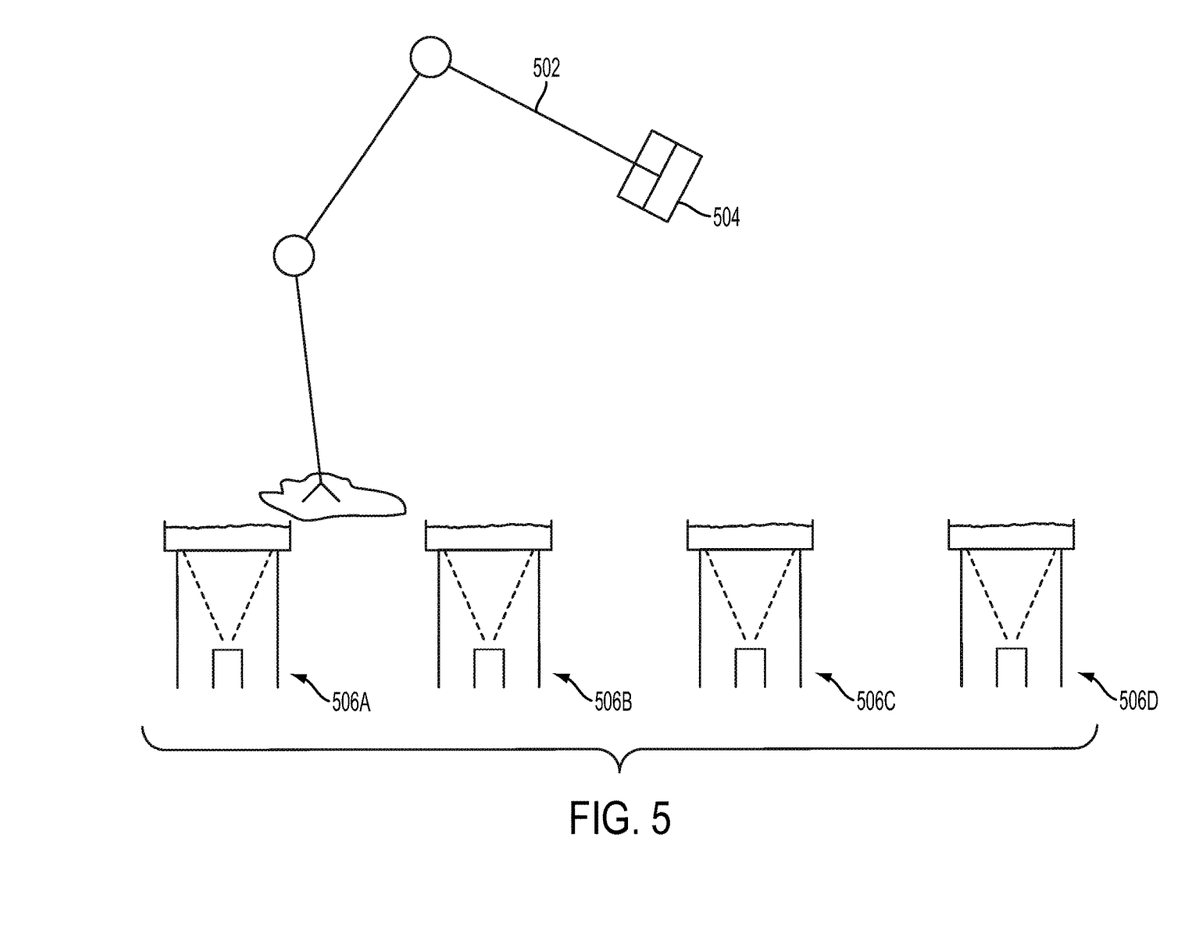
FIG. 5 shows a multi-stage 3D printer system with a single robotic device, according to an example embodiment.

For example, FIG. 5 shows a multi-stage 3D printer system with a single robotic device, according to an example embodiment. In particular, 3D printer system 500 includes a robotic arm 502 that is operable to move a base plate 504 with six degrees of freedom. Further, 3D printer system 500 includes four printing stations 506A to 506D, which each include a resin container and a projector. Each printing station 506A to 506D could include a different type of photo-reactive resin in its respective resin container. Alternatively, two or more of the printing stations 506A to 506D could include the same type of photo-reactive resin.

In the illustrated embodiment, the four printing stations 506A to 506D are all within reach of the robotic arm 502. In other words, the robotic arm 502 is capable of moving the base plate over and/or dipping the base plate into the resin containers in all four of the printing stations 506A to 506D. As such, the 3D printer system 500 is capable of printing an object having up to four different types of layers (e.g., formed from four different types of resin).

It should be understood that variations on the illustrated multi-phase 3D printing system are possible. For example, more or less than four printing stations are possible. As another example, multiple robotic arms could be employed to increase the build volume of the 3D system. In such a system, each robotic arm could include a base plate as an end effector, and the robotic arms could coordinate their movements so that layers of the same object are formed on two or more base plates at the same time. Other variations are also possible.

V. CONCLUSION

While various aspects of the disclosure have been disclosed herein, other aspects and embodiments will be apparent to those skilled in the art. Accordingly, the embodiments disclosed herein are for purposes of illustration, and are not intended to be limiting, with the true scope and spirit of the disclosure being indicated by the following claims.

What is claimed is:
1. A three-dimensional printer system comprising:
   a resin container;
   a base plate;
   a light source arranged below the resin container, wherein the light source is operable to emit electromagnetic radiation that causes resin in the resin container to cure;
   a robotic device having the base plate attached thereto, wherein the robotic device positions the base plate above the resin container and is operable to move the base plate with at least two degrees of freedom, such that a build volume of the three-dimensional printer system extends beyond the edges of the resin container and a horizontal cross section of the build volume is larger than a horizontal cross section of the resin container; and
   a control system that is operable to:
   (a) receive data specifying a three-dimensional structure; and
   (b) based at least in part on the specified structure, generate control signals that coordinate movement of the base plate by the robotic device and operation of the light source to form the three-dimensional structure from layers of resin, wherein each layer of resin is formed by exposure of resin in the resin container to electromagnetic radiation from the light source.

2. The system of claim 1, wherein the robotic device comprises a robotic arm.

3. The system of claim 2, wherein the robotic arm is operable to move the base plate with six degrees of freedom.

4. The system of claim 1, wherein the resin comprises a liquid resin that cures when exposed to ultraviolet (UV) electromagnetic radiation.

5. The system of claim 4, wherein the light source comprises a UV light source.

6. The system of claim 1, wherein the system further comprises a surface agitator configured to agitate resin in the resin container.

7. The system of claim 6, wherein the surface agitator comprises an automated surface agitator, and wherein the control signals further comprises control signals for the surface agitator that operate the surface agitator after each layer of the three-dimensional structure is formed.

8. The system of claim 1, wherein, to generate the control signals, the control system is operable to:
   (i) generate light control signals for the light source; and
   (ii) generate corresponding robot control signals for the robotic device.

9. The system of claim 8, wherein the control system is further operable to generate one or more timing signals that coordinate the light control signals with the corresponding robot control signals.

10. The system of claim 1, wherein the robotic device is operable to vary an angle of a face of the base plate with respect to the resin container.

11. The system of claim 1, wherein the control signals comprise a set of control signals that corresponds to each layer of resin, wherein the set of control signals that correspond to a given layer of resin comprise: (a) at least one light control signal specifying a shape of the given layer and (b) one or more robot control signals that cause the robotic device to orient the base plate with a specified pose with respect to the resin container.

12. The system of claim 11, wherein the specified pose of the base plate varies between at least two consecutive sets of control signals that correspond to a sequence of two or more layers of resin, such that the resulting layers of resin in the three-dimensional structure are angled with respect to one another.

13. The system of claim 9, wherein the three-dimensional structure comprises at least one overhang.

14. A three-dimensional printer system comprising:
a base plate;
a plurality of resin containers comprising at least a first resin container and a second resin container;
a plurality of light sources, wherein at least one light source is arranged below each resin container;
a robotic device having the base plate attached thereto, wherein the robotic device is operable to move the base plate between the plurality of resin containers such that the base plate is positionable above each of the resin containers while a layer of resin is being formed on the base plate, and wherein the robotic device is operable to move the base plate with at least two degrees of freedom such that a build volume of the three-dimensional printer system extends beyond the edges of the resin container and has a horizontal cross section that is larger than the horizontal cross section of the resin container; and
a control system that is operable to:
  (a) receive data specifying a three-dimensional structure; and
  (b) based at least in part on the specified structure, generate control signals that coordinate movement of the base plate by the robotic device and operation of the plurality of light sources to form the three-dimensional structure from layers of resin, wherein at least a first layer of resin is formed by exposure of resin in the first resin container to electromagnetic radiation from the at least one light source under the first resin container, and at least a second layer of resin is formed by exposure of resin in the second resin container to electromagnetic radiation from the at least one light source under the second resin container.

15. The system of claim 14, wherein the first resin container holds a first type of resin and the second resin container holds a second resin container, such that the three-dimensional structure is formed from at least two types of resin.

16. The system of claim 14, wherein the robotic device comprises a robotic arm.

17. The system of claim 14, wherein the robotic arm is operable to move the base plate with six degrees of freedom.

18. The system of claim 14, wherein the robotic device is operable to vary pose of the base plate with respect to a given one of the resin containers.

19. The system of claim 14, wherein the control signals comprise a set of control signals that corresponds to each layer of resin, wherein the set of control signals that correspond to a given layer of resin comprise: (a) at least one light control signal specifying a shape of the given layer and (b) one or more robot control signals that cause the robotic device to orient the base plate with a specified pose with respect to a given one of the resin containers.

20. The system of claim 19, wherein the specified pose of the base plate varies between at least two consecutive sets of control signals that correspond to a sequence of two or more layers of resin, such that the resulting layers of resin in the three-dimensional structure are angled with respect to one another.

21. The system of claim 1, wherein the robotic device is operable to move the base plate with at least six degrees of freedom.

22. The system of claim 1, wherein the robotic device is operable to move the base plate with at least three degrees of freedom.

* * * * *